Jan. 31, 1933.  E. E. KLEINSCHMIDT  1,895,718
SELECTIVE SIGNALING AND CONTROL SYSTEM
Filed April 16, 1928  3 Sheets-Sheet 1
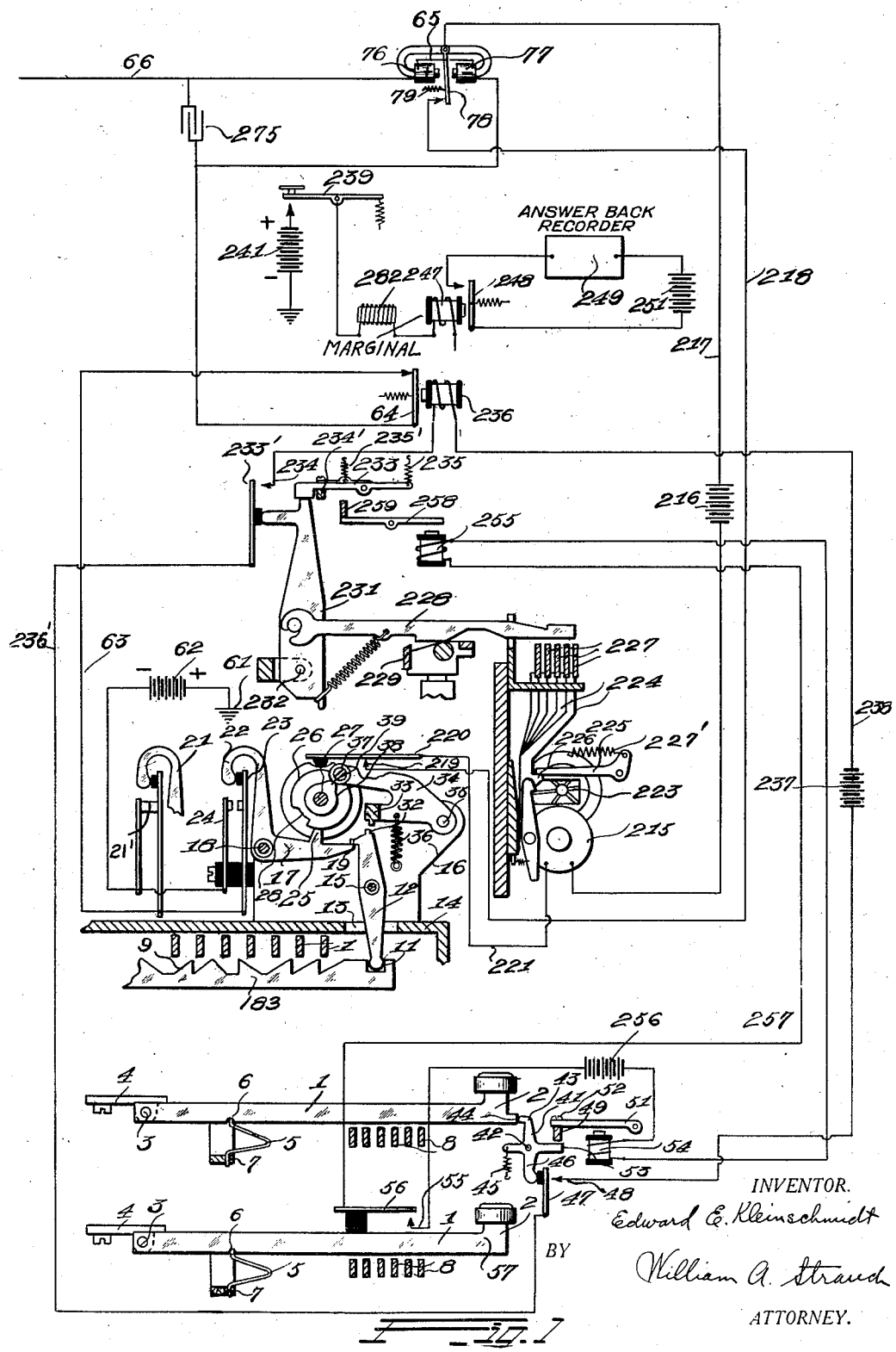
INVENTOR.
Edward E. Kleinschmidt
BY William A. Strauch
ATTORNEY.

Jan. 31, 1933. E. E. KLEINSCHMIDT 1,895,718
SELECTIVE SIGNALING AND CONTROL SYSTEM
Filed April 16, 1928 3 Sheets-Sheet 2
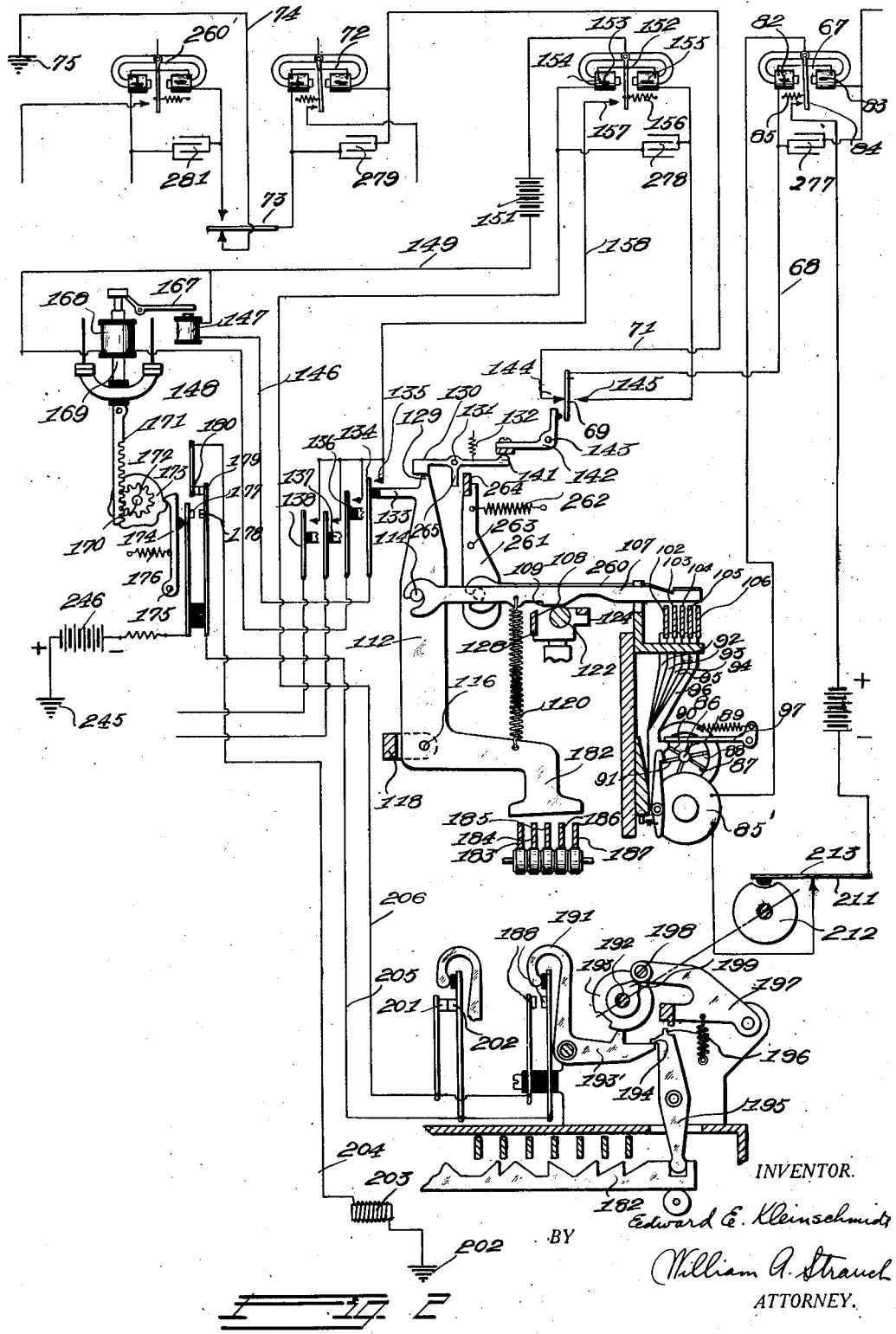
INVENTOR.
Edward E. Kleinschmidt
BY
William A. Strauch
ATTORNEY.

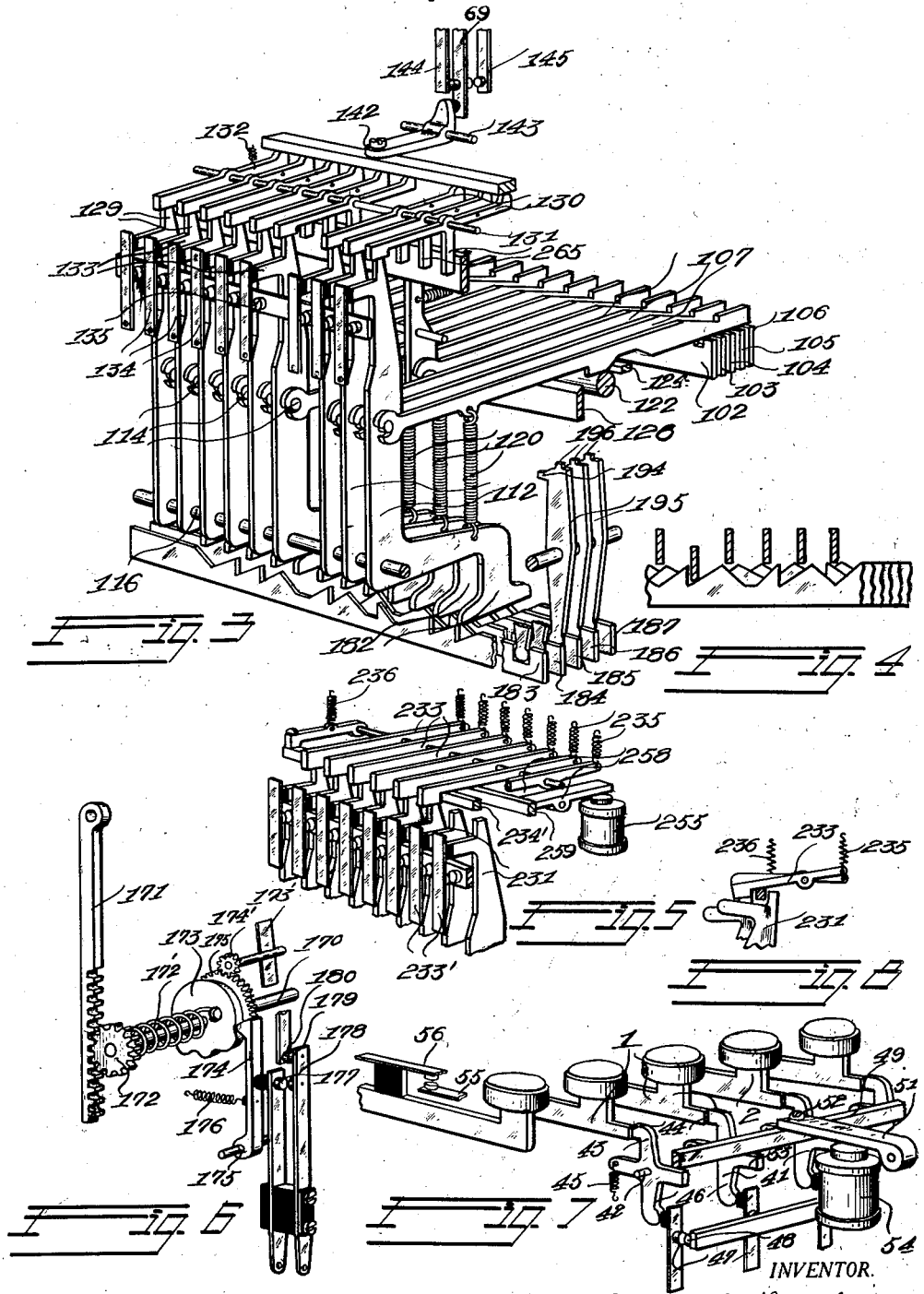

Patented Jan. 31, 1933

1,895,718

REISSUED

UNITED STATES PATENT OFFICE

EDWARD E. KLEINSCHMIDT, OF CHICAGO, ILLINOIS, ASSIGNOR TO TELETYPE CORPORATION, OF CHICAGO, ILLINOIS, A CORPORATION OF DELAWARE

SELECTIVE SIGNALING AND CONTROL SYSTEM

Application filed April 16, 1928. Serial No. 270,385.

My present invention relates to selective signaling and control systems, and more particularly to the selective control and supervision for a control station of devices such as circuit breakers, motors and the like located at a point remote from the first station.

The development of large electric power systems in recent years has been in the direction of replacing the few large sized sub-stations in a system by a large number of small sized sub-stations scattered over an electrical system in accordance with the power requirements at the various localities. Such a network, however, of small sub-stations connected with a main generating station cannot be made commercially practicable unless the sub-stations are unattended. An automatic equipment operating in response to changes in power conditions has, therefore, been developed. As a result, most present day operating sub-stations particularly on electrified railway systems are now entirely unattended, the circuit breakers and other power units located therein being operated automatically in response to such changes as load voltage and current.

While such automatic equipment has been found to be satisfactory for performing the necessary operations while normal conditions exist in the power system, it has been found impractical to develop automatic equipment which responds to abnormal conditions, such for example as serious short circuits of a persistent nature, and excessive power demands for short periods on one power circuit. Such abnormal conditions are not, however, unusual and must be properly taken care of.

In order to render the power system sufficiently flexible to take care of all conditions there has developed in recent years manual remote controls, now known as supervisory control systems in which signaling circuit connections are made between a dispatching office located in the central generating station and each of the automatic sub-stations, whereby the dispatcher can selectively control each of the automatic circuit breakers or other apparatus units.

The system is also provided with answer back equipment which operates in response to the operation of any one of these units for giving the dispatcher an indication of the condition of the unit. In this manner, he is apprized at all times of the condition of all the units and can at all times selectively operate any one of the units at any one of the stations. There is thus provided an automatic system with manual control superimposed meeting the commercial necessities of the former and the flexibility inherent in the latter.

Accordingly, it is an object of my invention to provide means for selectively controlling and supervising remotely disposed power apparatus units from a central dispatching point which is simple, inexpensive and reliable.

Another object of my invention is to provide simple and inexpensive code responsive telegraph equipment for selectively conditioning remotely disposed power equipment units for direct control by a dispatcher and for providing the dispatcher with indications of the operations of these units.

Still another object of the invention is to provide a mechanical selector in a supervisory control system for identifying the remote selection made so that the dispatcher is assured of the particular operation he will make before an operation occurs.

Other objects of my invention will appear in the following detailed description of the preferred embodiment of my invention, and are such as may be attained by utilization of the various principles, combinations and sub-combinations hereinafter set forth and defined by the terms of the appended claims.

In the drawings—

Figure 1 is a diagrammatic view of the circuits and apparatus at a dispatcher's office.

Figure 2 is a diagrammatic view of the circuits and apparatus at a sub-station.

Figure 3 is a perspective view of a preferred form of selector receiving apparatus at a sub-station.

Figure 4 is a view partly in section of the notched bars employed in the receiver.

Figure 5 is a perspective view of the receiver apparatus employed at the dispatching office which operates following a selection of a remote operating circuit made by the dispatcher to identify the selection.

Figure 6 is a perspective view of the code break wheel attached to the circuit breaker which operates in response to an operation thereof for transmitting a code to the dispatcher's office in accordance with said operation.

Figure 7 is a perspective view of the keyboard transmitter employed by the dispatcher for transmitting the code to selectively operate the remote unit.

Figure 8 is a side view of a locking device for locking any operated selected lever in operated position and the non-operated selector levers in non-operated position.

As shown in Figures 1 and 7, a keyboard comprising a plurality of key levers, 1 have upturned front ends 2 pivotally supported at 3 to a lever carrying member 4 which is properly secured to the frame of the transmitting apparatus. A spring 5 engaging each key lever 1 at an indent portion 6 thereof, and secured at its opposite end to the frame work at 7 normally maintains the lever 1 in its normal and non-operating position.

In co-operative relation with each of the key levers 2 are a plurality of longitudinally slidable bars 8, provided with bevelled lugs 9. As is well understood by those skilled in the art, when a key lever 1 is moved to its operated position against the action of compressing spring 5, the lower edge of the key lever engages the cams or bevelled portions of certain of the bars 8 and the further downward movement of the key lever 1 moves certain of these bars 8 longitudinally in either direction depending upon the slope of the bevelled portion engaged. In this manner, the keys when operated serve to set these bars in different combinations. At its right hand end, each permutation bar 8 is provided with a notch 11 in its upper edge which engages the rounded lower end of a corresponding selecting finger 12. The selecting fingers 12 extend upwardly through an opening 13 in the base frame 14 and are mounted upon a common pivotal support 15 arranged between uprights 16. The fingers 12 control a set of switch shifters in the form of bell cranks 17 mounted upon a horizontal pivot shaft 18 carried by the upright 16. Each selecting finger 12 has a hook lug 19 at its upper end, which as the associated permutation bar is shifted, is moved into or out of engagement position above the ends of the horizontal arm of the associated switch shifters 17. The fingers 12 and bell cranks 17 are held in proper position by spacing washers (not shown) and preferably a guide comb (not shown) is also provided for the horizontal arms of the bell cranks or switch shifters 17. In addition to the switch shifters controlled by the permutation bars, an additional switch shifter 21 is provided not controlled by the selecting fingers. The contacts of this shifter are normally closed and are opened upon the first movement of the controller as will be described in more detail hereinafter.

Each bell crank or switch shifter 17 has a hook 22 at its upper end which engages the insulated upper end of a spring contact finger 23, each of which co-operates with stationary contact finger 24, mounted upon an insulated block carried by the upright 16. Each spring contact 23 tends to engage its associated contact 24 and also by producing a counter-clock-wise rotational force on the associated switch shifter 17 serves to hold a lug 25 on the horizontal arm of the corresponding switch shifter in engagement with the surface of a cylindrical cam 26, the latter being mounted on a horizontal shaft 27 extending above the horizontal arms of the switch shifters or controllers 17. The cam 26 is provided with a helical series of slots of which one slot 28 is shown and which as the cam 26 is rotated, successively pass over the lugs 25 of the switch controllers 17. As the corresponding slot passes over one of the lugs, its associated switch contacts are closed provided the horizontal arm of the switch controller 17 is not held down by the corresponding selecting finger.

The shaft 27 is journalled in bearings (not shown) in the frame. Normally the cam 26, which is frictionally engaged by the shaft 27 is prevented from rotating therewith by means of a stop mechanism (not shown) which is controlled by the key levers 1 to release the disk in a manner described in detail in patent to Krum—1,595,472, issued August 10, 1926, in which is also found a clear description of the specific manner of mounting the shaft 27 and the cams herein illustrated diagrammatically. Inasmuch as the specific details of this construction do not constitute part of the present invention, they are merely described in general.

Fingers 12 are provided at their upper ends with upwardly projecting lugs 32 having bevelled upper edges which cooperate with a bevelled rib 33 on a locking bail 34. The latter is pivotally mounted at 35 on the upright 16 and a spring 36 secured thereto and the upright 16 tends to depress the lock bail and to hold a roller 37 thereon in engagement with the dwell portion 38 of the transmitter cam 26. A lug 39 on the cam engages the roller 36 during the zero or normal arrested position of the transmitter cam and thus holds the lock bail 34 in raised position against the tension of spring 36. Shortly after the cam starts, the spring 36 depresses the lock bail and holds the selecting fingers 12 and permutation bars 8 in set position and since each bar has an inclined surface co-operating with each of the key levers, none of the key levers except the one depressed can be operated until the lock bail is raised to release fingers 12.

As shown in Figures 1 and 7, each lever 1 is provided with a key lever lock 41 pivoted at 42. The upwardly extending arm 43 is forced into engagement with the end 2 of its associated lever at lug 44 by spring 45. The downwardly extending portion 46 engages the insulated portion of contact member 47 which when it engages the opposite contact 48, prepares a circuit for switching the signaling line between the dispatcher's office and sub-station from connection with the transmitter at the dispatcher's office to connection with the receiver. This circuit is thus switched when the transmitter has completely operated. When any key lever 1 operates, lug 44 on the associated latch slips over the upper edge of the key lever and locks the key in operated position. At the same time, contact 47 engages contact 48 to prepare the circuit referred to above. A universal restoring bar 49 secured to armature 51 by screw 52 engages the horizontally projecting arm 53 of the lock lever operated to restore it to its normal position. Armature 51 is operated by magnet 54, the circuit for which is completed over contacts 55 and 56 associated with the restoring key lever 57. When key lever 57 is operated, magnet 54 is operated and rocks armature 51 which in turn operates the universal bar 49 into engagement with the horizontal arm of the operated lock lever to restore the same and its associated key lever to normal disengagement position.

As is well understood by those skilled in the art, the transmitter cam 26 is divided into seven sections of which one is shown in its operated position, when the cam 26 is in its arrested normal or zero position. The contact 21' of its associated switch controller 21, is accordingly closed to normally hold the line closed. Operation of any key lever 1 will release the cam 26 for rotation. As the cam 26 rotates, the switch controllers 17 will be variably operated as the succeeding sections of the cam 26 pass through the operated position, in accordance with the setting of the permutation bars to close or hold open the other pairs of contacts 23 and 24 during the five selecting intervals of the signal. At the end of the signal and before the cam is arrested, the switch controller will invariably restore the line to no current which will normally maintain a stop condition as the first section of the cam is again moved into operating position.

The lug 39 releases the lock bar 34 before the transmitter cam 26 is arrested so that if the keys 1 are rapidly operated the transmitter cam can be continuously rotated to transmit the signals to the line. But even under such conditions, the signals will be separated by intervals of normal line conditions which prevail as the first section of the cam member passes through the operated position so that ample opportunity is afforded the cams of the receiver to reach normal or zero position at the end of each signal before the starting condition of the succeeding signal is impressed on the line.

As illustrated, if the transmitter contacts are connected directly to the line, the latter is normally closed. The starting interval is one of no current and the selecting signals are permutations of current and no current intervals.

When a key lever 1 is moved to its operated position it will engage the cam surfaces 9 of the permutation bars 8 to move these bars longitudinally either to the right or left, depending upon the slope of the cam surface 9 of the bar when engaged by the key lever 1. These will, in turn, rock certain of the selecting bars 12 about their pivots 15 counter clockwise to engage their associated switch controllers 17 through lugs 19. This movement of a key lever 1 also releases the cam 26 which is then rotated with the shaft 27. Upon the first movement of the shaft 27, the lug 39 releases the locking bar 34 which thereupon engages the lug 32 to lock the selecting bars 12 in their operated or non-operated positions. These bars cannot, therefore, be operated by any other key bar 1 during the signaling period. As the cam 26 then continues to rotate and the lugs 25 enter their cam depressions 28, successively, the successive switch controllers 17 are either released for operation or held in non-operative position by the lugs 19 engaging the switch controllers 17, to in turn close the contacts 23 and 24.

As the contacts 23 and 24 are successively closed, a circuit is completed from ground at 61 through battery 62 through the contacts 24 and 23 over the conductor 63, back contact and armature 64, through the line polar relay 65 over conductor 66 connecting the dispatcher's office and sub-stations through the polar relay 67, conductor 68, armature 69, and its back contact over conductor 71, a second sub-station through the polar relay 72 thereat, armature 73 and its back contact over conductor 74 to ground 75.

The normally biased polar relay 65 connected in the line circuit at the transmitting station comprises a pair of windings 76 and 77 and armature 78 normally held in a biased position in engagement with its left hand contact by the spring 79 as shown. The impulses from battery 62, however, are of such polarity as to operate armature 78 out of engagement with its contact, but, as will be explained hereinafter, this operation of relay 65 has no effect at this time.

At the sub-station, a similarly constructed polar relay 67 comprising a pair of windings 82 and 83 and a biased armature 84 held by spring 85 is provided. As will appear from the description to follow, with energy in the line from battery 62, the armature 84 is held disengaged from its contact. When, however, battery is removed from the line due to a start operation at the transmitter opening the line 21, spring 85 moves armature 84 to engage its contact. This operation of armature 84 completes an energizing circuit for receiver magnet 85' controlling a receiver at the sub-station to select an operating circuit for an apparatus unit.

The receiver magnet 85' operates an armature (not shown) to release and shift a cam shaft 86 axially during its rotation in a manner described in detail in patent to Kleinschmidt, 1,567,392 issued December 29, 1925. The cam shaft 86 is of the pin barrel type described in detail in the above referred to patent. A number of cams 87 to 91 are axially spaced along the shaft 86 so that when the selector magnet 85' is energized, and the cams 87 to 91 are successively associated with their respective fingers 92 to 96, they will be in line with them, but when the selector magnet is deenergized the cams will pass between the fingers as the cam shaft rotates.

The first positive impulse on the line releases the shaft 86 for rotation by permitting the armature 84 to engage its contact and thereby establish the circuit over line 211 to energize the magnet 85', but the succeeding impulses are effective upon certain of the fingers 92 to 96 in one or the other of their positions through the instrumentality of their associated cams 87 to 91. The actuated ones of these fingers are locked in actuated position by the latches 97 individual to each of the fingers 92 to 96. When the fingers 92 to 96 have been completely set, selected ones of notched permutation bars 102 to 106 are permitted to move to selected position under the influence of springs (not shown) in accordance with the setting of the fingers 92 to 96. Immediately thereafter the selector fingers are in condition to be reset. The cam shaft 86, it will be understood, is driven through a friction clutch from a shaft (not shown) which is in turn driven by a continuously rotating motor (not shown) in the manner described in detail in the above referred to patent.

As is well understood, the various combinations of selector bar positions bring into alignment different combinations of the notches thereof, and a selected actuating bar 107 positioned directly thereabove is permitted to drop, in the manner described in the above mentioned patent.

A series of these actuating bars 107 extending through guide plates (not shown) are arranged to co-act with the selector bars 102 to 106 to effect the desired selection. Each bar 107 is provided with a cam projection 108 and a shoulder 109. Certain of these actuating bars are pivotally connected to the circuit selecting bars 112 which are operated thereby to effect the desired selection of a power apparatus unit. The actuating bars 107 are connected to the operating bars 112 by means of pins 114. It will be apparent that movement of the actuating bar 107 to the right will rock the operating bar 112 clockwise about its pivot 116 carried on the support 118 on the framework.

Cam surfaces 108 on the actuating bars 107 are held by springs 120 against a universal bar 122 supported in member 124 which operates in a manner described in detail in the above referred to patent. Secured to the member 124 is a universal operating bar 128.

As pointed out above, after the selector fingers 92 to 96 have been positioned according to the received combination, the permutation bars 102 to 106 are moved to their selected position simultaneously as recited in the above referred to patent and the bail universal member 124 is started into operation. As soon as the bars 102 to 106 are set to align a set of notches, the member 124 is permitted to move forwardly as the bail frame moves forward, all of the actuating bars 107 are permitted to drop as the bar 122 passes from under cam surfaces 108 held in engagement with the member 122 by action of the springs 120. Since, however, only one set of slots may be aligned by each setting of the selector bars, all of the bars 107 except the selected one above the aligned notches are brought to rest by striking the selector bars, while the selected one drops far enough to permit engagement of the shoulder 109 with the operating bar 128.

The particular bar 107, over the aligned slots will continue to drop until it has entered therein when the continued movement of the operating bail frame 124 will cause the operating bar 128 to engage the shoulder 109 and will move this selected actuating bar 107 forwardly. The forward movement of the selector bar 107 will rock the circuit selecting bar 112 about its pivot 116. After the operating stroke of the selected actuating bar 107 has been completed, the operating bail 124 is moved in the reverse direction as described in the above referred to patent, and as it passes over the cam surface 108, it restores the selected bar 107 to normal.

The operating bar 112 is provided with a lug 129 which normally is engaged by the locking member 130 pivoted at 131 and urged into engagement with the lug 129 by the spring 132. Each of the operating bars 112 is provided with a horizontal arm 133 for controlling a contact member 134 individual thereto and properly insulated therefrom. Normally, the bar 112 is in the position shown, and holds the contact member 134 in disengagement from the stationary contact 135. When, however, the bar 112 is rocked about its pivot in the manner described above, the contacts 134 and 135 are closed. Similar contact members 136 to 138 are here illustrated, it being understood that each of these contacts is controlled by a similar operating bar 112, each contact in turn preparing an operating circuit for an individual power apparatus.

When the operating bar 112 is rocked about its pivot 116 in the manner described above, the locking bar 130 in co-operation therewith drops behind the lug 129 under the influence of the spring 132 and locks the selected bar 112 in operated position. This same movement of the locking member 130 through extension 141 rocks the bell crank 142 about its pivot 143 to shift the contactor 69 from engagement with its left hand contact 144 to engagement with its right hand contact 145.

It will be recalled that in the circuit traced above from the dispatcher's office to the sub-station, the circuit was completed through the contactor 69 and its contact 144. As a result of this switching operation, however, following the selection of bar 112 the signaling circuit from the transmitting station or dispatcher's office is switched from a selecting to an operating position for operating the selected unit in the manner which is now to be described.

Each of the circuits controlled by the individual contacts, such as 134 and 135 has associated therewith an apparatus unit which is to be controlled. In the present illustration, a single circuit breaker is shown, although it will be understood of course, that this is merely illustrative, and that similar circuit breakers and other power apparatus units may be controlled over the other selecting circuits completed by the other contacts illustrated. The conductor 146 connected to the contact 134 is also connected to the tripping magnet 147 associated with the circuit breaker 148, the other terminal of the tripping magnet 147 being connected over conductor 149 and battery 151 to armature 152 of polar or operating magnet 153. The polar or operating magnet 153 comprises, in addition to the armature 152, windings 154 and 155, the armature 152 being normally biased by spring 156 in the position shown. The contact 157 with which armature 152 engages when the polar relay 153 is energized by currents of a predetermined polarity, is connected over conductor 158 to the stationary contact 135 co-operating with contact 134.

The power apparatus unit 148 here illustrated, comprises, in addition to the tripping coil 147 which through the pivoted lever arm 167 trips the circuit breaker, a closing coil 168 for moving the arm 169 to engage their power contacts. A toothed rack 171 connected to the circuit breaker arm meshes with a pinion 172 mounted on spindle 170 which carries rotatably therewith a cammed disk or break wheel 173. A helical spring 172' one end of which is secured to spindle 170, and the other to break wheel 173 is tensioned by rotation of pinion 172 to rotate wheel 173, Fig. 6. A regulator 173' controlling pinion 174' meshes with gear 175 carried on shaft 170 and controls the speed of operation of disk 173. A contact controller 174 pivotally mounted at 175 is forced into engagement with the cammed disk 173 by the spring 176. As the pinion 172 rotates, as a result of either a tripping or restoring movement of the circuit breaker, the contact controller 174 moves the contact 177 into engagement with its associated contact 178 a predetermined number of times and breaks the contact 179 from engagement with its associated contact 180. A code combination of impulse conditions is thereby transmitted to the dispatcher's office in accordance with the operation of the circuit breaker in a manner to be described in detail hereinafter. It will be understood that a different type of cammed disk 173 is provided for each circuit breaker so that on operation each sends a different code combination of impulse conditions. It will be noticed that the breaker wheel 173 is equipped with a plurality of cams irregularly disposed so that upon tripping the circuit breaker 148 one sequence of signal may be produced while upon closing the breaker, the wheel 173 travels in the reverse direction and another sequence of signals may be produced.

It will be noted that the circuit selecting member 112 in addition to closing the contacts 134 and 135 is provided at its opposite extremity with a downwardly extending portion 182 which engages a series of cammed permutation bars 183 to 187, as shown in detail in Figure 3. The bars 183 to 187 comprise a code transmitting apparatus at the sub-station similar to the code transmitter operated by the keyboard bar 1 at the dispatching office described in detail above and need not, therefore, be again described. Each of the members 112, when selectively operated, will move the permutation bars 183 to 187 longitudinally in different combinations to in turn cause closing of different combinations of the contactors 188 under control of the switch actuating member 191 as the cam shaft 192 rotates. It will be understood that there are a number of these contacts selectively closed as described in connection with the transmitter at the dispatcher's office. Cams 193 are radially notched about cam shaft 192, tending sequentially to permit the movement of those bell cranks 193' which are not locked by the lugs 194 on selecting bars 195. The selecting bars 195 are held in operated or non-operated positions by lugs 196 engaging the locking bars 197 after the roller 198 has passed over the cam projection 199.

The construction and operation of the transmitter at the sub-station is identical with that at the dispatching office, the cam shaft disk being normally held from rotation is started into rotation together with the operation of any one of the bars 182 to transmit a code over contacts such as 188 in accordance with the bar operated and the switch bars selected in accordance therewith. During non-operation of the transmitter, the line 66 is closed, a circuit extending from ground at 202 through the coil 203, conductor 204, contacts 180 and 179 in engagement, over conductor 205 through the contacts 202 and 201, conductor 206 through the relay 153 over the contact 145, and contactor 69 which, it will be recalled, is then in engagement with its right hand contact over conductor 68 through line relay 82, conductor 66, relay 65 at the dispatcher's office, armature 64 and its back contact, conductor 63, contacts of bell crank 21 and battery 62 to ground at 61. Upon operation of member 112, members 183 to 187 are operated in various combinations to in turn operate their individual levers 195 and at the same time shaft 192 is released for rotation all as described in connection with the control station transmitter. Thereafter a code is transmitted over this circuit from the substation to the dispatcher's station in accordance with the selected member 112 to indicate to the dispatcher whether or not its selection was proper..

At this time, operation of relay 82 has no effect on the receiver magnet 85' at the sub-station inasmuch as its circuit is opened at contact 211 by the rotation of cam 212. The transmitting cam shaft 192 is connected to disk 212 so that when it starts into rotation the disk 212 is also rotated and contact engaging arm 213 disengages the contact 211.

As a result of the operation of polar relay 65 at the dispatcher's office, armature 78 engages its contact to complete a circuit for the magnet 215 over a circuit from battery 216, conductor 217, the armature 78 in engagement with its contact, conductor 218 through the contacts 219 and arm 220, conductor 221, and through the operating magnet 215 to the battery 216. The operating magnet 215 operates selector equipment similar in construction to that described in detail at the sub-station. A pin barrel selector 223 is normally held from rotation by a constantly driven motor shaft and is released by the first energization of magnet 215. As the selector 223 rotates, it is successively operated by magnet 215 to position selector fingers 224 in operated position. The selector fingers 224 will set permutation bars 227 to in turn condition one of the operating bars 228 for operation by operating member 229. The movement of operating member 229 in turn rocks selector member 231 about its pivot 232. An individual pivoted latching lever 233 mounted above a universal bar 234' is normally held in its non-latching position by member 231. When, however, a member 231 is moved to selected position, lever 233 is moved by its spring 235 to drop in front of the member and at the same time carrying universal bar 234' in front of the other members tensioning spring 235'. The operated fingers 224 are latched by the individual pivoted members 225 which drop in front of the projecting lugs 226 under operation of springs 227'. The operation of the selected bar 231 will also operate a contact 233' into engagement with the contact 234.

Inasmuch as each of these contacts 233' is connected over an individual conductor such as 236', to its contact 47 controlled by its associated key lever 1, it will be clear now that this circuit including the relay 236 will not be completed unless the received code indicative of the selection made at the sub-station is similar to the particular operated key bar at the dispatcher's office. If such is the case, a circuit will be completed from the battery 237 over conductor 238 through the relay 236, the contact 234 and contactor 233' in engagement over conductor 236' and through contactor 47 of the individual operated key lever 1, to the opposite terminal of battery 237. Energization of the relay 236 will then switch the armature 64 from engagement with its back contact, over which, it will be recalled, the code for the sub-station selection was transmitted, to the sub-station to engagement with its front contact connected to the relay 247 the operating key 239 and battery 241. The operation of the bar 231 thus apprizes the dispatcher of the correct selection inasmuch as the code transmitted from the sub-station to which the receiver at the dispatcher's office responded was proof that the particular selector bar 112 selected at the sub-station as a result of the code transmitted thereto, by the operator from the dispatcher's office was correct.

If the dispatcher now desires to operate the selected unit, it is only necessary to operate the key 239 to engagement with its contact, whereupon a circuit is closed from ground through the battery 241 over the key 239, relay 247, the front contact and armature 64 to the polar line relay 65, conductor 66, polar line relay 82, armature 69 and its contact 145, to the operating polar relay 153, conductor 206 to normally closed contacts 201 and 202 of the transmitter, conductor 205, contacts 179 and 180, conductor 204 and ground at 202. It will be noted that the polarity of this operating impulse is opposite from that of the code signals and accordingly the polar line relays 65 and 82 will merely tend to maintain their respective armatures in the bias position already maintained by their springs, and accordingly no operations will occur at these polar relays. The operating relay 153, however, is arranged to respond to this operating impulse to move its armature 152 from its biasing position maintained by spring 156 into engagement with its contact 157, and a circuit is thereupon completed for the particular selected unit. In the present case, the circuit for tripping solenoid 147 has been prepared and will now be completed from the battery 151 over conductor 149 through the tripping solenoid 147, conductor 146, through the contacts 134 and 135 in engagement and over conductor 158 to the contact 157 and armature 152, and then to the opposite terminal of the battery 151.

As a result of the energization of the tripping solenoid 147, the circuit breaker 148 will be tripped. As the circuit breaker moves, break wheel 173 is rotated to operate the contact lever 174 making contacts 177 and 178, and breaking contacts 179 and 180. It will be understood, that the cam portions on the break wheels 173 are peculiar to each circuit breaker and that a different combination of code signals is transmitted from each breaker. These signals are transmitted from ground at 245, battery 246, over contacts 177 and 178 in engagement over the conductor 205, through the normally closed contacts 201 and 202, conductor 206, to the polar relay 153, contact 145, and armature 69 conductor 68 through polar relay 82, conductor 66 polar relay 65, at the dispatching office to armature 64 and its right hand contact through the relay 247, key 239, and battery 241 to ground.

It will be noted that in this circuit, batteries 246 and 241 are connected in series relation and accordingly a larger current will flow in this answer back signal than in the case of the control operation. The relay 247 is marginal and will not respond to the normal operating current transmitted by the battery 241. When, however, the batteries 241 and 246 are in series relation as in the above circuit, sufficient curent flows through the relay 247 to operate it. As a result of the operation of relay 247, armature 248 in turn completes a circuit for the recorder 249 through battery 251. The recorder of any well known type is operated in accordance with the particular circuit breaker which has operated and the dispatcher is thus apprized of the particular unit which has operated and the manner of its operation.

It will be recalled from the above description that the selected operating bars 112 and 231 at the sub-station and office when operated, are locked in selected position and remain so until released by the operation of a special release key 57 at the dispatcher's office. In the present instance the restoring key 57 operates the notched bars 8 and simultaneously completes energizing circuit by the movement of the movable contacting member 56 into engagement with the contact 55 for the energizing magnets 54 and 255, the circuit being completed from battery 256 to the magnet 54 and magnet 255 in series over the conductor 257, the contact 56 in engagement with contactor 55 to the opposite terminal of the battery 256. As a result of the energization of the magnet 255, its armature 258 carrying a lug 259 on the end thereof, engages the lever 233 and moves it upward against the tension of its spring 235. Lock bar 234' is restored and releases operating member 231 which returns it to its normal position. Energization of magnet 54 operates its armature 51 to swing transversed bar 49 against projection 53 of the operated locking lever which is thus restored to release key lever 1. Simultaneously, the contact 47 disengages contact 48 and as a result, the energizing circuit for the relay 236 is opened and the armature 64 drops to engagement with its left hand contact preparing a circuit for the selector codes from the transmitter. The bar 57, as noted above, also operates a predetermined combination of the notched selecting bars 8 which in the manner described above transmit a special restoring code combination of impulses to the substation. During the transmission of this code of impulses as in the case above, contacts 220 and 219 separate so that operation of the polar relay 65 is not effective to release the local magnet 215. Polar relay 82 at the sub-station, however, moves its armature 67 into engagement with its contact completing an energizing circuit for receiving magnet 85'. A predetermined combination of selecting bars 102 and 106 are operated in accordance with this special restoring code to select an operating bar 260 associated with the lever arm 261, normally urged to its non-operating position by the spring 262. When the bar 260 is operated, it rocks the bar 261 about its pivot 263 and its lug 264 engages the projection 265 of the lever 130 which is thereupon rocked about its pivot 131 against the tension of spring 132 to release the operated bar 112 from its locked position. Bar 112 is thereupon restored to its normal position and opens the contacts 134 and 135. In this manner the apparatus is restored to normal following the operation of the selected unit and the answer back with this operation.

From the above, the operation of the apparatus should now be clear. When the operator at the dispatcher's office desires to operate any desired selected power unit, he will operate a key bar such as 1 for transmitting a code in accordance with the particular unit which he desires to operate. The transmitting and receiving apparatus at each of the stations is normally in a non-operating position. When the key bar is operated, the transmitter at the dispatcher's office is started into operation and transmits a predetermined code of negative and no current polarity as indicated by the terminal markings of battery 62. Simultaneously, the particular operated key bar 1 and selecting bars 8 respectively are all locked in their operated position to prevent the operation of any other key or transmission of any other code at this time. The operation of the particular key bar 1 in addition to transmitting the code, also prepares an operating circuit for the relay 236 at contact 47 which circuit is completed only when the correct code has been received from the sub-station indicating that the proper unit has been selected. As soon as the code transmitter at the dispatcher's office starts operating, it immediately opens the circuit of the receiving magnet 215 at contacts 219 and 220 to prevent the operation of the local receiver by operation of the line polar magnet 65. The impulses, however, operate the line polar magnet 82 at the sub-station, which in turn controls the local receiver magnet 85'. The first received impulse or start impulse which it will be understood, is not part of the code invariably operates relay 85'' to release its pin barrel selector. Accordingly, the transmitter at the office and receiver sub-stations always start substantially, simultaneously insuring synchronous operation. The magnet 85' now operates according to the code to select the particular operating bar 112, which will prepare a local selecting circuit to the particular unit which it is desired to be operated. A further result of the energization of this particular selecting bar 112 is also to operate a transmitter at the sub-station similar in construction and to the operation of the transmitter at the office. This selection, therefore, not only results in the preparation of an operating circuit at the sub-station, but will also start the code transmitter into operation which upon its first movement opens a local circuit to the magnet 85' at contact 211 and also transmits a code of impulses to the dispatcher's office. This code combination of impulses, it will be understood, depends upon the particular bar 112 which has been selected.

When the code is received at the dispatcher's office by the polar magnet 65, the circuit for the receiving magnet 215 is completed inasmuch as the code transmitter at the dispatcher's office has completed its operation and is restored to normal and the contacts 219 and 220 are again in engagement. The receiver will be operated to select an operating bar such as 231. Inasmuch as each of the selector bars 231 completes a circuit to an individual operating key bar 1, which has, as described above, been previously prepared for the relay 236, the relay 236 will not be energized unless the correct operating bar 228 is operated; namely, the one controlling the circuit connected to the circuit prepared by operating key bar 1. In this particular instance the bar 228 is individual to the particular key lever 2 and if it is operated by the received code, this indicates that the correct selection was made at the remote station, in accordance with the code transmitted by the dispatcher. The dispatcher is now certain that in case he transmits an operating impulse, it will operate the proper breaker. Relay 236 is energized preparing the operating circuit for the dispatcher.

Having thus been apprized of the correctness of the selection at the sub-station, the dispatcher may now operate the particular unit desired to operate, by closing the key 239. It will be noted that the selecting code was transmitted over a circuit completed over the back contact and armature 64. When the selection, however, has been properly made as evidenced by energization of the relay 236, the armature 64 is moved into engagement with its front contact preparing the circuit to key 239 for the operation desired and the dispatcher may now operate the selected unit by closing this key. It will be noted that the closing of the key 239 transmits an impulse of the opposite polarity from that transmitted by the selecting code and accordingly the relays 65 at the dispatcher's office and 82 at the sub-station will not be energized inasmuch as they are so biased that their impulses merely tend to maintain the armature in the bias position already maintained by their respective springs.

At the sub-station, operation of the bar 112 by the selecting code, not only prepares the individual circuit to the particular power unit desired to be operated, but also switches the signaling circuit from armature 69 and its contact 144 to engagement with contact 145, thereby connecting the polar operating relay 153 in the line circuit. This relay, it will be noted, is biased oppositely from the other polar relays in the line circuit so that the impulse of the opposite polarity such as issue when the operator depresses the key 239 while not operating the polar relays 65 and 82, will operate the polar relay 153 to move its armature 152 into engagement with its contact completing the prepared selecting circuit to the power unit desired, in this case, the tripping coil 147.

The tripping of the circuit breaker automatically operates a code transmitter by rotating the cam disk 173 for transmitting a code combination of impulses over the signaling line. Battery 246 at the sub-station and 241 being in series, currents of increased value are transmitted. Although this current will operate the polar relay 153, it will obviously have no further effect inasmuch as it merely continues energizing the trip coil 147. At the dispatcher's office, however, the impulses will operate the relay 247 which is marginal and accordingly was not operated by the operate impulses from battery 241 alone. Energization of relay 247 in turn operates the answer back recorded 249 which is of a well known type employed in the telegraph art.

It will be clear that not only the apparatus units located at the first sub-station may be thus operated, but also apparatus units located at the sub-station at which the polar relay 72 is located. Since the number of operations which may be made, depends merely upon the number of impulses in each code, any practical number of selections can be made. Certain of these selections can be completed at the first sub-station and others at the second sub-station associated with the polar relay 72. The armature 73 is moved into engagement with its front contacts in the same manner as the armature 144 moves into engagement with its right hand contact 145 for completing a circuit to the operating polar relay 260'' at the second sub-station. Similarly, the signaling line can be extended through other sub-stations for selections thereat as desired. It will be evident from this that a single continuous circuit can be employed for making selections at a plurality of sub-stations.

It will be noted that condensers such as 277, 278, 279 and 281 are connected across the armature contacts for the purpose of preventing arcing during the operation of the contacts, inasmuch as the present system is particularly adapted for transmission of current of telegraph magnitude thereby making the system considerably more rugged than has heretofore been possible. Windings 203 and 282 are connected in the circuit for preventing a short circuiting of the batteries.

Although a separate selecting circuit is employed in this system for closing and tripping a breaker, it will be clear that the same selecting circuit using currents of different characteristics such as two frequencies for tripping and closing may be employed. It is also possible with this system to select a circuit for controlling any combination of breakers simultaneously by connecting a plurality of magnets 147 in a line 146.

It will be clear from the above description, that an arrangement is shown whereby applying telegraph equipment with its accompanying ruggedness and operation, selections made by code combinations of impulses first identify for the dispatcher the selection made before the selected unit is operated and provides answer back signals operated in accordance with the particular unit operated and its particular operation to apprize the dispatcher of the conditions of the operated units.

Although this invention is disclosed as applied to a specific arrangement, it will be understood that the invention has broader application and may be applied in numerous other manners.

Having shown and described the preferred embodiment of my invention, it will be apparent that many equivalents will present themselves to those skilled in the art. The present invention is not limited to the use of the specific embodiment in the specific arrangement shown. Therefore, what is desired to be secured by Letters Patent and is claimed as new is:

1. In a supervisory control system, a control station, a remote station, a plurality of devices at said remote station to be controlled from the control station over said line, a rotary start stop code transmitter and a rotary start stop code receiver at each of said stations normally in operative relation with said signaling line, means for operating said code transmitter at said control station for transmitting a code combination of impulses to said remote station over said line, means controlled by the transmitter at said control station for preventing the operation of said receiver thereat during the transmission of said code, means whereby said code receiver at said remote station is responsive to said code for conditioning one of said devices thereat for operation and means including the code transmitter at the remote station for transmitting a verifying code to said control station over said line in accordance with said device selected, means at said control station responsive to said code for operating the receiver thereat to verify said selection, means at said remote station for preventing the operation of said receiver thereat during the transmission of said verifying code and means at said control station for operating said selected device at said remote station.

2. In a signaling system, a control station, a remote station, a plurality of apparatus units at said remote station, a signaling line connecting said stations, relay means connected in said signaling line, permutation mechanism at said remote station, electromagnetic means controlled by said relay means for variably operating said permutation mechanism in accordance with received code combinations of impulses, a code transmitter at said remote station, said code transmitter and said permutation mechanism being normally in a non-operating condition, means responsive to the first impulses received by said relay means for starting said permutation mechanism into operation, a plurality of devices, means controlled by said permutation mechanism for variably operating one of said devices, means controlled by one of said devices for conditioning an apparatus unit at the remote station for operation, and for starting and variably operating said code transmitter thereat, means controlled by said code transmitter for transmitting code combinations of impulses over said signaling line through said line relay and means whereby said permutation mechanism thereat is non-responsive to said code combinations of impulses.

3. In a signaling system, a control system, a remote station, a plurality of apparatus units at said remote station, a signaling line connecting said stations, relay means connected in said signaling line, permutation mechanism at said remote station, electromagnetic means controlled by said relay means for variably operating said permutation mechanism in accordance with received code combinations of impulses, a code transmitter at said remote station, said code transmitter and said permutation mechanism being normally in a non-operating condition, means responsive to the first impulses received by said relay means for starting said permutation mechanism into operation, a plurality of devices, means controlled by said permutation mechanism for variably operating one of said devices, means controlled by one of said devices for conditioning an apparatus unit at the remote station for operation and for starting into operation and variably operating said code transmitter, means controlled by said code transmitter for transmitting code combinations of impulses over said signaling line through said relay means, means whereby said permutation mechanism at said remote station is non-responsive to said code combinations of impulses and permutation means at said control station responsive to said impulses for variably operating a signaling device in accordance with the received code.

4. In a signaling system, a control station, a remote station, a plurality of apparatus units at said remote station, a signaling device at said control station, a signaling line connecting said stations, relay means connected in said signaling line, permutation mechanism at said remote station, electromagnetic means controlled by said relay means for variably operating said permutation mechanism in accordance with received code combinations of impulses, a code transmitter at said remote station, said code transmitter and said permutation mechanism being normally in non-operating condition, means responsive to the first impulses received by said relay means for starting said permutation mechanism into operation, a plurality of devices, means controlled by said permutation mechanism for variably operating one of said devices, means controlled by one of said devices for conditioning an apparatus unit at the remote station for operation and for starting and variably operating said code transmitter, means controlled by said code transmitter for transmitting code combinations of impulses in accordance with the selection made over said signaling line through said relay means, means whereby said permutation mechanism at said remote station is non-responsive to said code combinations of impulses, permutation means at said control station responsive to said impulses for variably operating said signaling device thereat in accordance with the received code, relay means connected in said signaling line at said control station, electromagnetic means responsive to said last mentioned relay means for variably operating said permutation mechanism at said control station in accordance with received code indicating the selections made at the remote station, a code transmitter for transmitting code combinations of impulses for variably operating the permutation mechanism at said remote station and means whereby said code receiver at said control station is rendered non-responsive to the code transmitted by said code transmitter thereat.

5. In a signaling system, a control station, an operating key at said control station, a remote station, apparatus units and an operating means at said remote station, a device at said control station for each of said units, a signaling line connecting said stations, a rotatable code transmitter and receiver at each of said stations, said transmitter and receiver being normally in a non-operating condition, means responsive to the operation of one of said devices for starting said code transmitter thereat into rotation, means controlled by said code transmitter for transmitting code combinations of impulses over said signaling line, means whereby said code receiver at said control station is rendered non-responsive to said code combination, means responsive to the impulses of said code combination for releasing said code receiver at said remote station, means whereby said code receiver in response to said code combination of impulses received over said signaling line conditions one of said apparatus units for operation and simultaneously starts said transmitter thereat into operation for transmitting a code combination of conditions in accordance with the selection made, means responsive to the operation of said code transmitter thereat for releasing said code receiver at said control station into rotation, means whereby said code receiver at said remote station is rendered non-responsive to said transmitted code, means at said receiving station responsive to the variable operation of said code receiver thereat for making a selection means whereby if said code received agrees with the code transmitted said operating key is rendered operative and means controlled by said operating key for operating said operating means at said remote station for operating said conditioned apparatus unit.

6. In a signaling system, a control station, an operating key at said control station, a remote station, apparatus units and an operating means at said remote station, a device at said control station for each of said units, signaling means at said control station for indicating the condition of said units, a signaling line connecting said stations, a rotatable code transmitter and receiver at each of said stations, said transmitter and receiver being normally in a non-operating condition, means responsive to the operation of one of said devices for starting said code transmitter thereat into rotation, means controlled by said code transmitter for transmitting code combinations of impulses over said signaling line, means whereby said code receiver at said control station is rendered non-responsive to said code combination, means responsive to the impulses of said code combinations for releasing said code receiver at said remote station, means whereby said code receiver in response to said code combination of impulses received over said signaling line conditions one of said apparatus units for operation and simultaneously starts said transmitter thereat into operation for transmitting code combinations of conditions in accordance with the selection made, means responsive to the operation of said code transmitter thereat for releasing said code receiver at said control station into rotation, means whereby said code receiver at said remote station is rendered non-responsive to said transmitted code, means at said receiving station responsive to the variable operation of said code receiver thereat for making a selection, means whereby if said code received agrees with the code transmitted said operating key is rendered operative, means controlled by said operating key for operating said operating means at said remote station for operating said conditioned apparatus unit and means whereby responsive to the operation of said unit said signaling means is operated at said control station in accordance with the unit operation.

7. In combination, a control station, a remote station, a plurality of devices at said remote station to be selectively controlled from said control station, transmitting and receiving means at each of said stations, operating means at said control station, a signaling line connecting said stations, said signaling line being normally connected to said transmitting means at said control station and to said receiving means at the remote stations, means including said transmitting means at said transmitting station for variably operating said receiving means at said remote station, means responsive to the operation of said receiving means at said remote station for selecting one of said devices for operation, operating means at said remote station normally disconnected from said signaling line, said receiving means being simultaneously operated in response to said control station transmitting means to connect said operating means to said signaling line, operating means at said control station for tion, said transmitting means at said remote station operating in response to said selection of a unit for directly operating said receiving means at said control station over said signaling line, said control station receiving means being responsive to control from said remote station transmitting means for switching said signaling line from said transmitting means at said control station to said operating means thereat, means including said operating means and said signaling line for operating said operating means at said remote station and means responsive to the operating means at said remote station for operating said selected device.

8. In a supervisory control signal; a control station; a remote station; a signaling line connecting said stations; a line switch therefor; electromagnetic means for operating said switch; a plurality of apparatus units at said remote station; a key bank comprising a plurality of key levers at said control station; a normal non-operating code transmitter at said control station normally connected to said line; means controlled by the operation of any one of said key levers for starting said code transmitter into operation to transmit code combinations of signaling conditions over said line to said remote station in accordance with the operated key lever; means responsive to the operation of said key lever for locking said key lever in operated position and the remaining key levers in non-operated position and for preparing a circuit for said line switching electro-magnetic means; means at said remote station responsive to said received code combination for selecting a unit for operation; means at said remote station responsive to the selection of one of said units for transmitting a code combination of signaling conditions to said control station in accordance with the selection made thereat; a code receiver at said control station responsive to said received code combinations of signaling conditions for completing the circuit of said line switching means; operating means; means controlled by said switching means for disconnecting said control station transmitter from said signaling line and switching said line to said operating means; means including said operating means operative over said switched line for operating said selected apparatus unit.

9. In a supervisory control system; a control station; a remote station; a signaling line connecting said stations; a line switch therefor; electro-magnetic means for operating said switch; a plurality of apparatus units at said remote station; a key bank comprising a plurality of key levers at said control station; a normal non-operating code transmitter at said control station normally connected to said line; means controlled by the operation of any one of said key levers for starting said code transmitter into operation to transmit code combinations of signaling conditions over said line to said remote station in accordance with the operated key lever; means responsive to the operation of said key lever for locking said key lever in operated position and remaining key levers in non-operated position and for preparing a circuit for said line switching electro-magnetic means; means at said remote station responsive to said received code combination for selecting a unit for operation; means at said remote station responsive to the selection of one of said units for transmitting a code combination of signaling conditions to said control station in accordance with the selection made thereat; a code receiver at said control station responsive to said received code combinations of signaling conditions for completing the circuit of said line switching means; operating means; means controlled by said switching means for disconnecting said control station transmitter from the signaling line and switching said line to said operating means; means including said operating means operative over said switched line for operating said selected apparatus unit, and means responsive to the operation of said unit for indicating said operation at said control station.

10. In a supervisory control system; a control station; a remote station; a single signaling line connecting said stations; normal non-operating start stop transmitting and receiving apparatus at each of said stations; a plurality of apparatus units at said remote station; operating key levers individual to each apparatus unit at said control station; means controlled by the operation of any one of said key levers for starting said code transmitter thereat into operation to transmit a start condition and a code combination of signaling conditions over said line in accordance with the key lever operated; means responsive to a start condition for starting said code receiver at said remote station into operation; means for operating a single electro-magnet at said remote station responsive to said received code combinations of impulse conditions for variably operating said receiver in accordance with the received code combination; means controlled by said code receiver for selecting one of said apparatus units for operation; means controlled by said selection for starting said code transmitter at said remote station into operation to transmit a code combination of signaling conditions over said signaling line to said control station in accordance with the selection made; and a single electro-magnet at said control station responsive to code combinations of impulse conditions for variably operating said control receiver at said control station in accordance with the received code for indicating the selection made at the remote station.

11. In a supervisory control system; a control station; a remote station; a single signaling line connecting said stations; normal non-operating start stop transmitting and receiving apparatus at each of said stations, said transmitting apparatus being normally connected to said line; a plurality of apparatus units at said remote station; operating key levers individual to each apparatus unit at said control station; operating means at said control station; means controlled by the operation of any one of said key levers for starting said transmitting apparatus thereat into operation to transmit a start condition and a code combination of signaling conditions over said line in accordance with the key lever operated; means responsive to a start condition for starting said transmitting apparatus at said remote station into operation; a single electro-magnet at said remote station responsive to said received code combinations of impulse conditions for variably operating said receiver in accordance with the received code combinations; means controlled by said receiving apparatus for selecting one of said apparatus units for operation; means controlled by said selection for starting said transmitting apparatus at said remote station into operation to transmit a code combination of signaling conditions over said signaling line to said control station in accordance with the selection made; a single electro-magnet at said control station responsive to code combinations of impulse conditions for variably operating said receiving apparatus at said control station in accordance with the received code combination for indicating the selection made at the remote station; a switching means for switching said signaling line from said transmitting apparatus at said control station to said operating means; a plurality of electric circuits for said switching means one for each of said key levers; means whereby each of said circuits is prepared in response to the operation of its associated key lever; and means whereby said prepared circuit is completed in response to the operation of the associated receiving apparatus whereby said switching circuit is completed only if said received code combination indicates that the remote selection was made in accordance with the operated key.

12. In a supervisory control system; a control station; a remote station; a single signaling line connecting said stations; normal non-operating start stop transmitters and receivers at each of said stations, said transmitters being normally connected to said line; a plurality of apparatus units at said remote station; operating key levers individual to each apparatus unit at said control station; operating means at said control station;

means controlled by the operation of any one of said key levers for starting said code transmitter thereat into operation to transmit a start condition and a code combination of signaling conditions over said line in accordance with the key lever operated means responsive to a start condition for starting said receiver at said remote station into operation; a single electro-magnet at said remote station responsive to said received code combinations of impulse conditions for variably operating said receiver in accordance with the received code combinations; means controlled by said receiver for selecting one of said apparatus units for operation; means controlled by said selection for starting said transmitter at said remote station into operation to transmit a code combination of signaling conditions over said signaling line to said control station in accordance with the selection made; a single electro-magnet at said control station responsive to code combinations of signaling conditions for variably operating said control receiver at said control station in accordance with the received code combination for indicating the selection made at the remote station; switching means for switching said signaling line from said code transmitter to said operating means; a plurality of electric circuits for said switching means one for each of said key levers; means whereby each of said circuits is prepared in response to the operation of its associated key lever; means whereby said prepared circuit is completed in response to the operation of the associated receiving means whereby said switching circuit is completed only if said received code combination indicates that the remote selection made was made in accordance with the operated key; and means controlled over said switched circuit for operating said selected unit.

13. In a supervisory control system; a control station; a remote station; a single signaling line connecting said stations; normal non-operating start stop transmitters and receivers at each of said stations, said transmitters being normally connected to said line; a plurality of apparatus units at said remote station; operating key levers individual to each apparatus unit at said control station; operating means at said control station; means controlled by the operation of any one of said key levers for starting said code transmitter thereat into operation to transmit a start condition and a code combination of signaling conditions over said line in accordance with the key lever operated; means responsive to a start condition for starting said receiver at said remote station into operation; a single electro-magnet at said remote station responsive to said received code combinations of signaling conditions for variably operating said receiver in accordance with the received code combination; means controlled by said receiver for selecting one of said apparatus units for operation; means controlled by said selection for starting said transmitter at said remote station into operation to transmit a code combination of signaling conditions over said signaling line to said control station in accordance with the selection made; a single electro-magnet at said control station responsive to code combinations of impulse conditions for variably operating said control receiver at said control station in accordance with the received code combination for indicating the selection made at the remote station; switching means for switching said signaling line from said code transmitter to said operating means; a plurality of electric circuits for said switching means one for each of said key levers; means whereby each of said circuits is prepared in response to the operation of its associated key lever; means whereby said prepared circuit is completed in response to the operation of the associated receiver whereby said switching circuit is completed only if the received code combination indicates that the remote selection made was made in accordance with the operated key; means controlled over said switched circuit for operating said selected unit; and means controlled over said switched circuit in response to the operation of said unit for indicating said operation at said controlled station.

14. In a supervisory control system; a control station; a remote station; a start stop code transmitter and code receiver at each of said stations; an electro-magnet for controlling said start stop receiver at each of said stations; a single circuit connecting said transmitters and receivers including means whereby said start stop receivers cannot be started into operation while the transmitter at their respective stations is in operation; a plurality of apparatus units at said remote station; operating keys individual to each of said apparatus units at said control station; means controlled by the operation of any one of said keys for starting said code transmitter at said control station into operation to transmit a code combination of signaling conditions over said circuit in accordance with the key operated; means at said remote station responsive to said received code combination for operating said receiving magnet thereat whereby said receiver thereat is variably operated in accordance with the received code and said transmitter thereat is correspondingly operated to return a verification signal to the receiver at said control station; and means controlled by the received code combination at said remote station over said line for selecting one of said units for operation.

15. In a supervisory control system; a control station; a remote station; a start stop code transmitter and code receiver at each of said stations; an electro-magnet for controlling said start stop receiver at each of said stations; a single circuit therefor controlled by the code transmitter thereat whereby said start stop receivers cannot be started into operation while said transmitter thereat is in operation; a plurality of apparatus units at said remote station; operating keys individual to each of said apparatus units at said control station; means controlled by the operation of any one of said keys for starting said code transmitter at said control station into operation to transmit a code combination of signaling conditions over said line in accordance with the key operated; means at said remote station responsive to said received code combination for operating said receiving magnet thereat whereby said receiver thereat is variably operated in accordance with the received code; means controlled by the received code combination for selecting one of said units for operation; means responsive to the selection of said unit for starting said code transmitter at said remote station into operation; means controlled by said remote transmitter for transmitting a code combination of signaling conditions over said line in accordance with the selected unit; means at said control station responsive to said received code combinations of impulse conditions for variably operating said receiver magnet thereat; and means controlled by said receiver in accordance with the operation of said magnet for indicating said selection.

16. In a supervisory control system; a control station; a remote station; a signaling line connecting said stations; a start stop code transmitter and code receiver at each of said stations normally connected for transmission over said line; an operating means at said control station; an electro-magnet for controlling said start stop receiver at each of said stations; a circuit therefor controlled by the code transmitter thereat whereby said start stop receivers cannot be started into operation while said transmitter thereat is in operation; a plurality of apparatus units at said remote station; operating keys individual to each of said apparatus units at said control station; means controlled by the operation of any one of said keys for starting said code transmitter at said control station into operation to transmit a code combination of signaling conditions in accordance with the key operated; means at said remote station responsive to said received code combination for operating said receiving magnet to actuate said receiver in accordance with the received code; means controlled by the received code combination for selecting one of said units for operation; means responsive to the selection of said unit for starting said code transmitter at said remote station into operation; means controlled by said remote transmitter for transmitting a code combination of signaling conditions in accordance with the selected unit; means at said control station responsive to said received code combinations of signaling conditions for variably operating said receiver magnet thereat; means controlled by said receiver in accordance with the operation of said magnet for indicating said selection; and means operative only in the event that said selection agrees with said operated key lever for switching said line to said operating means.

17. In a supervisory control system; a control station; a remote station; a signaling line connecting said stations; a start stop code transmitter and code receiver at each of said stations normally connected for transmission over said line; an operating means at said control station; an electro-magnet for controlling said start stop receiver at each of said stations; a circuit therefor controlled by the code transmitter thereat whereby said start stop receivers cannot be started into operation while said transmitter thereat is in operation; a plurality of apparatus units at said remote station; operating keys individual to each of said apparatus units at said control station; means controlled by the operation of any one of said keys for starting said code transmitter at said control station into operation to transmit a code combination of signaling conditions in accordance with the key operated; means at said remote station responsive to said received code combination for operating said receiving magnet thereat whereby said receiver thereat is variably operated in accordance with the received code; means controlled by the received code combination for selecting one of said units for operation; means responsive to the selection of said unit for starting said code transmitter at said remote station into operation; means controlled by said remote transmitter for transmitting a code combination of impulse conditions in accordance with the selected unit; means at said control station responsive to said received code combinations of impulse conditions for variably operating said receiver magnet thereat; means controlled by said receiver in accordance with the operation of said magnet for indicating said selection; means operative only in the event that said selection agrees with said operated key lever for switching said line to said operating means; and means controlled over said switched line for operating said selected unit.

18. In a supervisory control system; a control system; a remote station; a signaling line connecting said stations; a start stop code transmitter and code receiver at each of said stations normally connected for transmission over said line; an operating means at said control station; an electro-magnet for controlling said start stop receiver at each of said stations; a circuit for said magnets at each station controlled by the code transmitter thereat whereby said start stop receivers cannot be started into operation while said transmitter thereat is in operation; a plurality of apparatus units at said remote station; operating keys individual to each of said apparatus units at said control station; means controlled by the operation of any one of said keys for starting said code transmitter at the control station into operation to transmit a code combination of signaling conditions in accordance with the key operated; means at said remote station responsive to received code combinations for operating said receiving magnet thereat whereby the receiver thereat is variably operated in accordance with the received code; means controlled by the received code combination for selecting one of said units for operation; means responsive to the selection of said unit for starting said code transmitter at said remote station into operation; means controlled by said remote transmitter for transmitting a code combination of impulse conditions in accordance with the selected unit; means at said control station responsive to said received code combinations of impulse conditions for variably operating said receiver magnet thereat; means controlled by said receiver in accordance with the operation of said magnet for indicating said selection; means operative only in the event that said selection agrees with said operated key lever for switching said line to said operating means; means controlled over said switched line for operating said selected unit; and means controlled in accordance with the operation of said selected unit and operative over said switching line for indicating said operation at said control station.

In testimony whereof I affix my signature.

EDWARD E. KLEINSCHMIDT.